(12) United States Patent
Osswald et al.

(10) Patent No.: US 8,096,499 B2
(45) Date of Patent: Jan. 17, 2012

(54) DEVICE FOR FEEDING COMBUSTION AIR TO AN ENGINE OF AN AIRCRAFT

(75) Inventors: Bernd Osswald, Mertingen (DE); Serge Macchi, Salon de Provence (FR)

(73) Assignee: Eurocopter Deutschland GmbH, Donauwoerth (DE)

( * ) Notice: Subject to any disclaimer, the term of this patent is extended or adjusted under 35 U.S.C. 154(b) by 570 days.

(21) Appl. No.: 12/420,165

(22) Filed: Apr. 8, 2009

(65) Prior Publication Data

US 2010/0065139 A1 Mar. 18, 2010

(30) Foreign Application Priority Data

Apr. 8, 2008 (DE) .......................... 10 2008 017 962

(51) Int. Cl.
*B64D 33/02* (2006.01)
*B64C 27/00* (2006.01)
(52) U.S. Cl. ................................. 244/53 B; 244/17.11
(58) Field of Classification Search ................. 244/53 B, 244/55, 17.11, 58; 137/15.1, 15.2
See application file for complete search history.

(56) References Cited

U.S. PATENT DOCUMENTS

| 3,489,377 A | * | 1/1970 | Wright et al. ............... 219/85.15 |
| 4,171,112 A | * | 10/1979 | Harvey ........................ 244/12.5 |
| 4,190,217 A | | 2/1980 | O'Connor |
| 4,830,312 A | * | 5/1989 | Hain et al. ................. 244/17.11 |

FOREIGN PATENT DOCUMENTS

WO WO-2007090011 8/2007
* cited by examiner

*Primary Examiner* — Timothy D Collins
*Assistant Examiner* — Nicholas McFall
(74) *Attorney, Agent, or Firm* — Brooks Kushman P.C.

(57) ABSTRACT

A device for feeding combustion air to an engine disposed in an interior of an aircraft is comprised of a primary air inlet duct extending between an exterior surface of the aircraft and the engine, wherein the air inlet duct extends from air inlets disposed in a first region of the exterior surface; at least two further air inlet ducts extending between a second and third region of the exterior surface and the engine, so as to provide a three-way combustion air supply; and a control device configured to switch the air supply to the engine from either or both of the at least two further air inlets duct when a blockage occurs in the primary air inlet.

12 Claims, 3 Drawing Sheets

DEVICE FOR FEEDING COMBUSTION AIR TO AN ENGINE OF AN AIRCRAFT

Priority is claimed to German Patent Application No. DE 10 2008 017 962.0, filed on Apr. 8, 2008, the entire disclosure of which is incorporated by reference herein.

The present invention relates to a device for feeding combustion air to an engine of an aircraft, comprising a primary air-inlet duct, which extends between the exterior surface of the aircraft and an air inlet of the engine that is arranged in the interior and comprises an inlet-cover filter element in the region of the exterior surface.

The field of application of the present invention primarily extends to aircraft in the form of helicopters. In order to drive the rotor, an engine is housed within the cell of a helicopter. The engine is designed as an internal combustion engine that receives the air that is required for combustion from the environment. For this purpose a device according to the invention for feeding combustion air is arranged between the engine and an air inlet of the cell of the helicopter.

BACKGROUND

From WO 2007/090011 A2 a generic device is known. It comprises an air inlet duct that extends between the exterior surface of the helicopter and the engine, which is arranged on the interior, which air inlet duct comprises an inlet-cover filter element that is flush with the exterior surface of the helicopter. In this arrangement the inlet-cover filter element follows the contour of the exterior surface and comprises an exchangeable flat filter body that is held by a closed attachment frame made of metal, and that on both sides comprises a protective grille. The inlet-cover filter element filters the air from the environment, which air is ingested by the engine, in order to stop foreign objects and dirt particles from entering the engine by way of the air inlet duct. After a certain period of time the filter body of the inlet-cover filter element is usually blocked and requires cleaning. Thereafter it can again be placed into the attachment frame. The attachment frame is used to ensure the desired shape of the filter body and thus its function even at high rates of flow of air from the environment.

In the implementation of an inlet-cover filter element for the engines to be protected, for reasons associated with safety, it must always be ensured that the icing behaviour on the filter bodies and on the air inlet duct is kept within permissible limits. The installation of an inlet-cover filter element that is used to prevent premature engine wear as a result of erosion is always a far-reaching intervention in the conception of the air inlet duct. As a rule, only a single air inlet duct will be available for feeding combustion air to an engine. In such a single engine inlet, performance loss due to the pressure loss resulting from the filter body that is installed upstream will practically be unavoidable. Dangerous hazard conditions arise in particular when icing of the filter body results in total air impermeability.

In U.S. Pat. No. 4,190,217 a device for the supply of combustion air to an engine of an aircraft is stated, in which device the above-mentioned problem is solved in that in the region of the inlet-cover filter element an additional inflow flap is provided. If the inlet-cover filter element is clogged, then this inflow flap opens in order to lead a replacement airstream, which will then, however, not be filtered, to the engine. This emergency measure is associated with a disadvantage in that engine wear cannot be avoided. If the above-mentioned emergency situation arises, and if at the same time the air from the environment is severely contaminated with coarse dirt particles, emergency operation can directly lead to situations in which the engine sustains considerable damage.

From prior art it is also known, instead of providing an inflow flap that is arranged beside the inlet filter element, to design the filter element itself so that it is tiltable so that the gap forming between said filter element and the exterior surface of the aircraft makes possible an emergency supply of non-filtered combustion air. Most of the time this results in severe inlet losses to the engine. Since it must always be ensured that the available performance exceeds the maximum weight of the helicopter, this inlet loss is a limiting factor.

SUMMARY OF THE INVENTION

An aspect of the present invention is to provide an efficient device for feeding combustion air to an engine of an aircraft with simple technical means ensuring minimum engine wear but nevertheless providing an adequate air supply in emergency operation.

The invention includes the technical teaching according to which for the purpose of implementing a two-way airstream concept at least one further air inlet duct is provided which leads from another point on the exterior surface to the region of the air inlet, the air inlet duct comprising an associated further inlet-cover filter element, wherein the supply to the engine in the case of a blockage in the primary air-inlet duct switches over to the further air inlet duct according to a control device.

The solution according to the invention provides an advantage in particular in that by way of the further air inlet duct, in other words the reserve air inlet duct, which can comprise an inlet-cover filter element in the same manner as the primary air-inlet duct, in the case of an emergency an adequate quantity of combustion air can reach the engine. This measure improves operational safety of the aircraft because the performance of an engine is ensured in every case. In order to implement the measure according to the invention, it is merely necessary to affix a further inlet-cover filter element at a suitable position on the exterior surface of the cell of the aircraft, and to connect it to the air inlet of the engine by way of an air inlet duct.

According to a measure that improves the invention, it is proposed that the control device for switching over the air supply opens an associated inflow flap by way of the at least one further air inlet duct. In this arrangement the inflow flap can be arranged in the region between the air inlet duct and the air inlet of the engine. On the one hand it is imaginable to design the control device for switching over as an automatic electronic control device so that once a sensor has detected a blockage in an inlet-cover filter element said control device automatically opens the inflow flap for the further air inlet duct. On the other hand it is also imaginable to merely signal the blockage situation in the cockpit, so that the pilot can open the inflow flap of the further air inlet duct by manual intervention.

The inflow flap can be designed according to the following alternative embodiments:

It is proposed that the inflow flap be moved, along a rail guide by means of a hydraulic cylinder or an electric linear drive, between the open position and the closed position in the manner of a flat slide valve. This design has been shown to be particularly robust and can be implemented with simple technical means. As an alternative to this it is proposed that the inflow flap be affixed so that it is rotatable on a hinge. This design is particularly suitable where the design space is limited. However, the hingeable inflow flap should be arranged so that it opens in the direction of flow of the combustion air in order to support the opening by way of the suction effect of the engine.

According to a further measure that improves the invention, it is proposed that a blockage of the primary air-inlet duct is determined by means of a pressure sensor that is placed in that position and that is connected to an electronic control device, with the pressure sensor able to be arranged in the region of the air inlet of the engine. Any increasing clogging of the inlet-cover filter element, up to a blockage of the air stream, results in a drop in pressure in the downstream air inlet duct, and the drop in pressure can be determined by the pressure sensor. This value can be compared within the electronic control device, with a defined pressure threshold value that has been deposited in said control device. Once the predetermined pressure threshold value has been reached, signalling takes place to the effect that the further air inlet duct is to be connected. In the automatic variant, the subsequent connection takes place automatically. Instead of providing a pressure sensor that is designed in the manner of an absolute pressure sensor, it is also imaginable to use a differential pressure sensor for the above-mentioned purpose, where differential pressure sensor monitors the pressure differential between the air inlet duct and the environment, and once a defined pressure differential has been reached signals and/or initiates the switch-over according to the invention. Manual and automatic connection of the second air duct can also be carried out in a combinable manner, depending on the operating state. If prior to the complete clogging of the inlet-cover filter element the second inlet duct is connected in addition, then the air flowing around the aircraft ensures that there is negative pressure, and the air supply via the alternative route ensures that there is positive pressure at the inlet-cover filter element, which causes an automatic restoring effect as a result of a change in the direction of the air.

As far as the air-inlet duct design is concerned, alternative embodiments are also imaginable:

As a preferred embodiment it is proposed that two further air inlet ducts, each with associated end inlet-cover filter elements, are arranged opposite each other on both longitudinal sides of the exterior surface, where the longitudinal sides extend between fore and aft. This design is particularly suitable in the case of smaller helicopters because the lateral surfaces of the engine deck usually provide sufficient space to arrange the additional inlet-cover filter elements. Furthermore, this design and arrangement allows quite short air inlet ducts to the engine. In this design the air inlet ducts can be detachably attached to the firewall, which, for safety reasons, is advantageously affixed directly to the engine, which minimises installation expenditure.

According to yet another embodiment, which is suitable in particular for large helicopters, a single further air inlet duct for each engine with an associated end inlet-cover filter element is arranged at the top of the exterior surface of the helicopter. In particular the region of the exterior surface that is directly adjacent to the exiting main rotor shaft is suitable as a point of exit of this further individual air inlet duct.

Of course, it is also possible to combine the two previously mentioned preferred embodiments.

Since the air inlet duct usually extends adjacent to the engine, it is proposed that said air inlet duct be produced from a high-temperature-resistant BMI-(bismaleimide) material or material mixture with a component thereof and the addition of further materials, in particular carbon fibres. Apart from its high temperature resistance, this material also features a low specific weight and can be made to adapt in a simple manner to the different shapes of air inlet ducts.

Of course, it continues to be possible to combine the measure according to the invention of a two-way airsteam supply with conventional bypass flaps for the supply of non-filtered bypass air. However, such a bypass flap should only be used in an absolute emergency so as to avoid, if at all possible, any ingestion of non-filtered combustion air in the engine.

Further advantages, characteristics and application options of the present invention are stated in the following description in conjunction with the exemplary embodiments shown in the drawings.

Below, the invention is described in more detail with reference to the exemplary embodiments shown in the drawing.

BRIEF DESCRIPTION OF THE DRAWINGS

In the description, in the patent claims, in the abstract and in the drawing the terms and associated reference characters used in the list of reference characters below are used.

The drawing shows the following.

DETAILED DESCRIPTION

Figure 1:
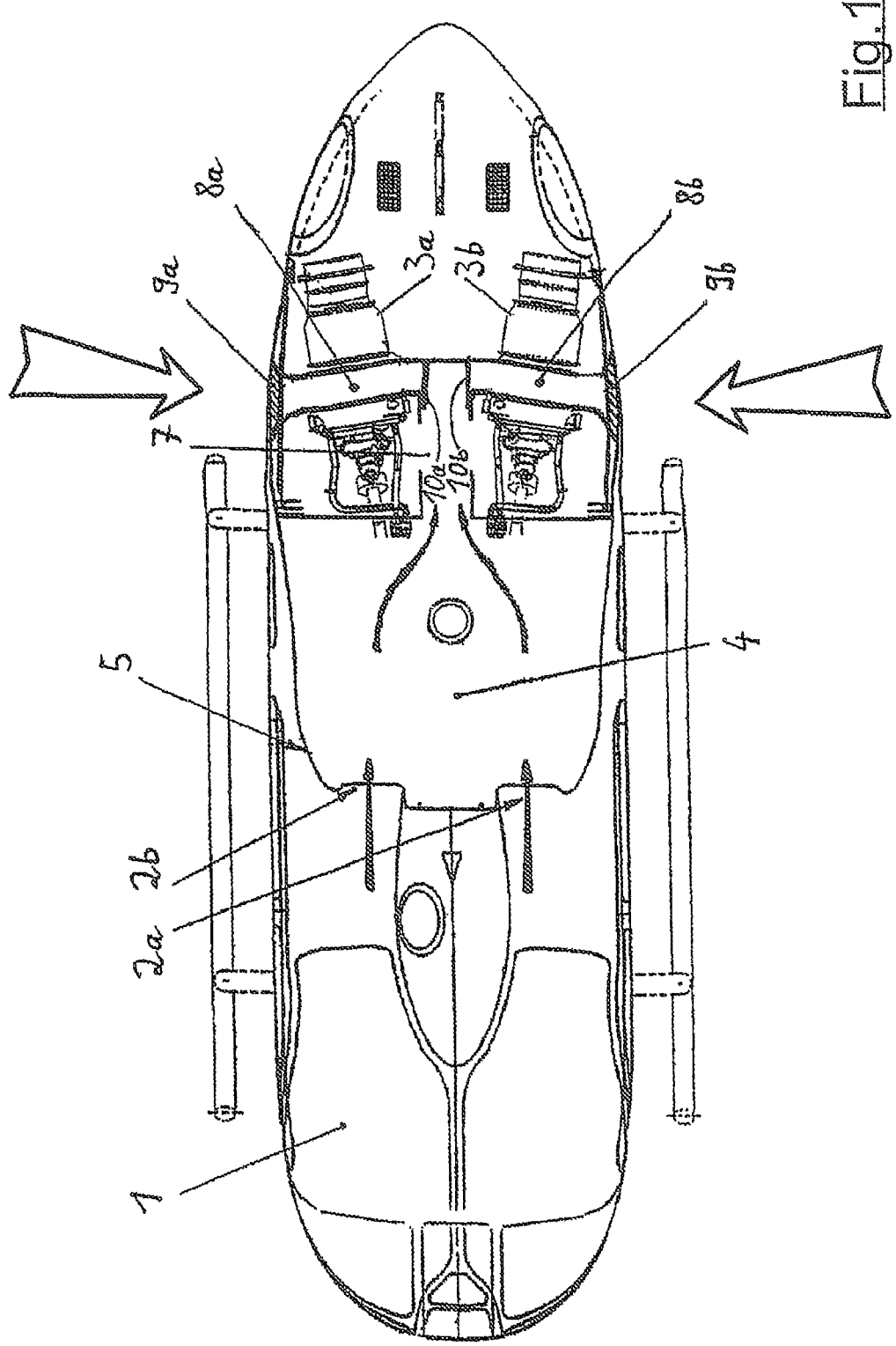
FIG. 1 a top view of the cell of a helicopter with two-way airstream guidance with the use of two air inlet ducts, in the illustration shown in their closed state.

In the following description and in the figures, for the purpose of avoiding repetition, the same reference characters are used for identical components, provided no further differentiation is required or sensible.

According to FIG. 1 in the upper part of a cell 1 of a helicopter there is a left-hand air inlet 2a and a right-hand air inlet 2b arranged adjacent to it, with both air inlets being used in normal operation. From the environment, combustion air flows to an engine 3a and an engine 3b arranged in the interior of the cell 1. A primary air-inlet duct 4, which starts at the air inlets 2a and 2b, passes through a main gearbox (not shown in detail in the illustration) of the helicopter.

In order to implement a two-way airstream concept, apart from the air inlet duct 4 that leads into a central duct 7 near the engine, two further air inlet ducts 8a and 8b each with associated inlet-cover filter elements 9a and 9b are arranged opposite each other on both longitudinal sides of the helicopter, which longitudinal sides extend between fore and aft of the cell 1. The two air inlet ducts 8a and 8b comprise a high-temperature resistant BMI material, and at their ends opposite the respective inlet-cover filter element 9a or 9b they comprise inflow flaps 10a or 10b.

During normal operation the two inflow flaps 10a and 10b remain in the closed position as shown in the illustration.

Figure 2:
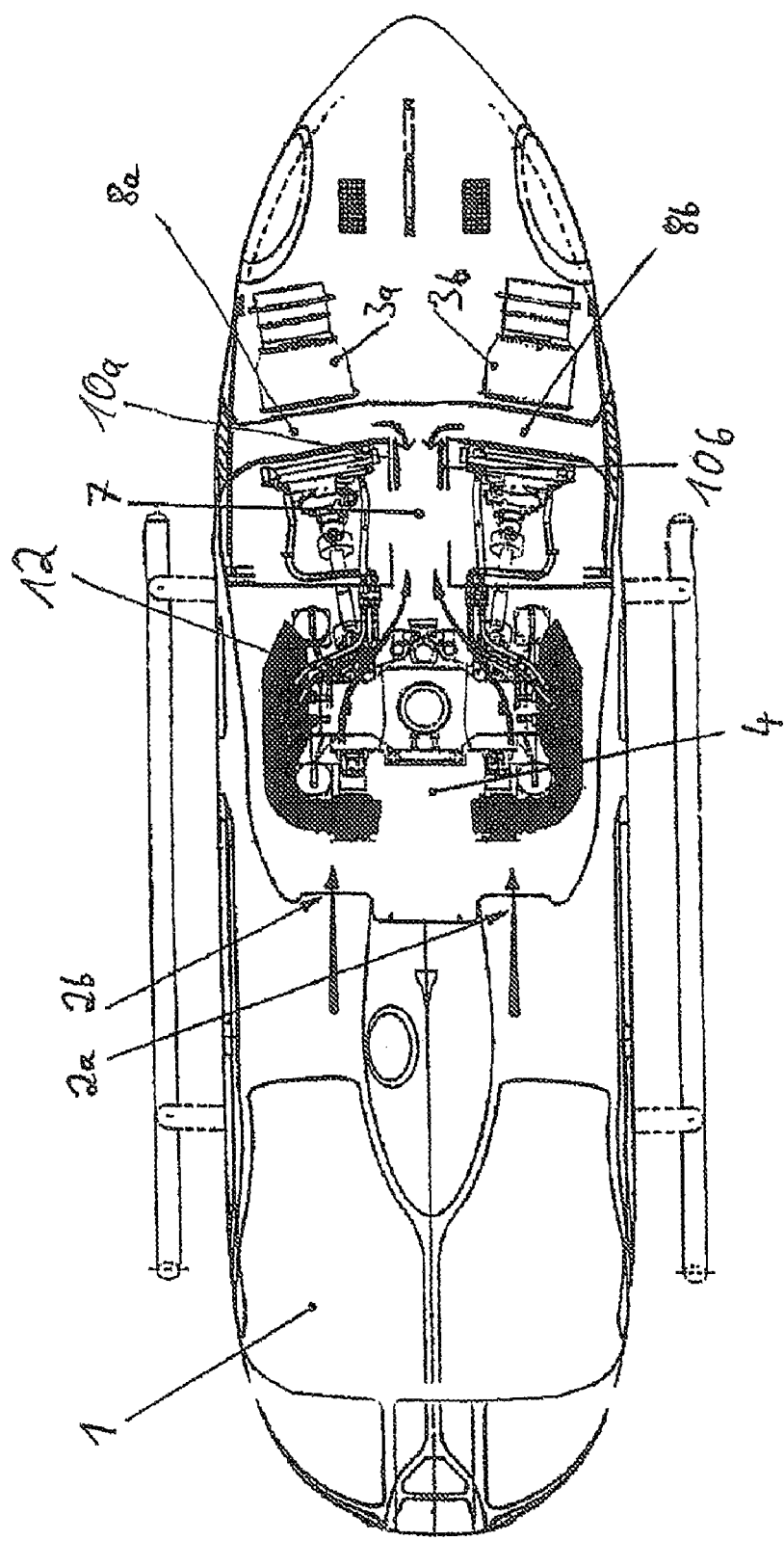
FIG. 2 a top view of the cell of a helicopter with two-way airstream guidance with the use of two air inlet ducts, in the illustration shown in their open state.

According to FIG. 2, the two inflow flaps 10a and 10b are in their open position, in which, by way of a substitute, combustion air is fed (see arrows) by way of the central duct 7 to the engine 3a, 3b. In this exemplary embodiment the two inflow flaps 10a and 10b are moved along a rail guide by means of hydraulic cylinders (not shown) between the open position and the closed position.

Starting from the air inlet 2a and 2b the combustion air, guided by the air inlet duct 4, flows past a main gearbox 12 of the helicopter and through the central duct 7 to the engine 3a and 3b.

In the case of an emergency, for example a blockage of the air inlets 2a, 2b, the two flaps 10a and 10b open so that the combustion air required by the engine 3a, 3b can be fed by way of the air inlet ducts 8a and 8b.

Figure 3:
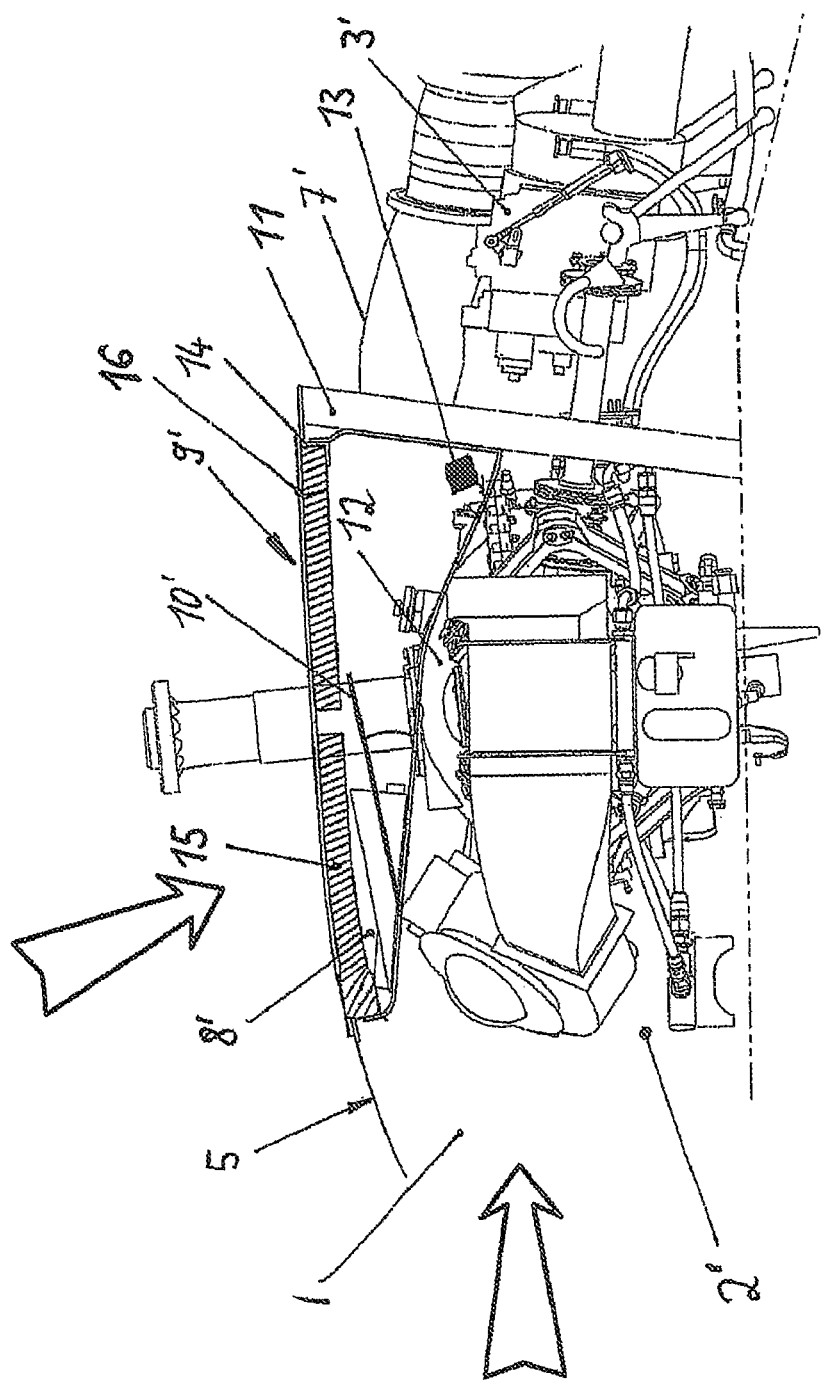
FIG. 3 a partial lateral section view of a detail of a helicopter in the region of the engine with two-way airstream guidance according to a further embodiment.

The further exemplary embodiment shown in FIG. 3 only shows a single further air inlet duct 8' for each engine, with an associated end inlet-cover filter element 9' on the exterior surface 5 of the cell 1 (only partially shown in the illustration). In this arrangement the air inlet duct 8' is detachably attached to a firewall 11 that is affixed to the engine 3'. The air inlet duct 8' is essentially box-shaped and is in place between the exterior surface 5 and the main gearbox 12.

In this exemplary embodiment the inflow flap 10' is rotatably attached to the air inlet duct 8' by way of a hinge. When the inlet filter element 9' and thus the air inlet duct 8 is blocked, the inflow flap 10' opens as a result of the drive so that, by way of a substitute, combustion air can reach the engine 3' by way of the further air inlet ducts 2' and 8'. This state of a blockage or of increasing clogging of the cover filter 9' is then detected by a pressure sensor 13 that is arranged on the air inlet duct 8'.

The inlet-cover filter element 9' comprises a closed attachment frame 14 that encloses a flat filter body 15. The filter body comprises a protective grille 16 at least on the outside.

LIST OF REFERENCE CHARACTERS

1 Cell
2 Air inlet
3 Engine
4 Air inlet duct
5 Exterior surface
7 Central duct
8 Air inlet duct
9 Inlet-cover filter element
10 Inflow flap
11 Firewall
12 Main gearbox
13 Pressure sensor
14 Attachment frame
15 Filter body
16 Protective grille

What is claimed is:

1. A device for feeding combustion air to an engine disposed in an interior of an aircraft comprising:
   a primary air inlet duct extending between an exterior surface of the aircraft and the engine, wherein the air inlet duct extends from air inlets disposed in a first region of the exterior surface and provides combustion air to the engine;
   at least two further inlet ducts extending between a second and third region of the exterior surface and the engine, so as to provide a three-way combustion air supply, with each of the at least two further inlet ducts having an end inlet-cover filter element;
   wherein the second and third regions are on opposite longitudinal sides of the exterior surface, the longitudinal sides extending between fore and aft of the aircraft; and
   a control device configured to switch the combustion air supply to the engine from either or both of the at least two further inlet ducts when a blockage occurs in the primary air inlet duct.

2. The device as recited in claim 1, further comprising at least one inflow flap corresponding to the at least one air inlet duct, and wherein the control device is configured to open the at least one inflow flap.

3. The device as recited in claim 2, wherein the at least one inflow flap is movable along a rail guide using a hydraulic cylinder or an electric linear drive between an open position and a closed position.

4. The device as recited in claim 2, wherein the at least one inflow flap is disposed so as to be rotatable on a hinge.

5. The device as recited in claim 1, further comprising a pressure sensor connected to the control device configured to detect the blockage of the air inlets, and wherein the control device contains a defined pressure threshold value.

6. The device as recited in claim 1, wherein the aircraft includes a second engine, and wherein one of the at least two further air inlet ducts supplies combustion air to the first engine and another of the at least two further inlet ducts supplies combustion air to the second engine and wherein the second region is at the top of the exterior surface of the aircraft.

7. The device as recited in claim 6, further comprising a firewall affixed to the engine and wherein the at least one air inlet duct for each engine is detachably attached to the firewall.

8. The device as recited in claim 6, wherein the at least one air inlet duct is comprised of a high-temperature-resistant BMI (bismaleimide) material.

9. The device as recited in claim 6, wherein the inlet-cover filter element includes a closed attachment frame enclosing a flat filter body, the flat filter body including a protective grill at least externally.

10. The device as recited in claim 1, wherein the at least one further air inlet duct includes at least one further inlet-cover filter element.

11. The device as recited in claim 1, wherein each air inlet includes an additional inlet-cover filter element.

12. A helicopter comprising:
   a rotor-driving engine; and
   a device for feeding combustion air to the engine, the device including a primary combustion air inlet duct extending between an exterior surface of the aircraft and the engine, wherein the air inlet duct extends from air inlets disposed in a first region of the exterior surface;
   at least two further air inlet ducts extending between a second and third region of the exterior surface and the engine, so as to provide a three-way airstream supply; and
   a control device configured to switch the combustion air supply to the engine from the primary air inlet duct to either or both of the at least two further air inlet ducts when a blockage occurs in the primary air inlet duct.

* * * * *